United States Patent Office 3,211,700
Patented Oct. 12, 1965

3,211,700
POLYURETHANE PROCESS USING PEROXIDES
AND CATALYSTS
Lewis B. Weisfeld, Oakland, N.J., assignor to United States Rubber Company, New York, N.Y., a corporation of New Jersey
No Drawing. Filed Sept. 21, 1960, Ser. No. 57,401
10 Claims. (Cl. 260—75)

This invention relates to polyurethane elastomers and, more particularly, to a method of forming elastomeric products through the use of a liquid casting operation. Said products are characterized both by having an outstanding resistance to repeated flexing and by being highly elastomeric.

The term "polyurethane elastomers" is used herein to represent those elastomers characterized by recurrent NHCOO groups and which are prepared by curing the reaction product of a polyisocyanate and an active hydrogen-containing compound. These elastomers are known to have unusually high resistance to abrasion and to exhibit excellent tensile strengths. In view of these features, it has long been desired to produce a satisfactory polyurethane tire.

There are two basic methods for shaping polyurethane elastomers. In one method, a liquid is cast into a mold and then cured therein and removed in essentially final shape. The second method, which is more costly than the first for most shaped objects, involves the formation of a solid (i.e., "gum") polyurethane intermediate which is then shaped by a variety of fabrication techniques while in the solid state and thereafter cured.

Reasonably good polyurethane tires have been made through the latter technique by methods akin to conventional tire technology. No satisfactory polyurethane tires have been obtained by the liquid casting technique because those polyurethane rubbers (formed by liquid techniques) which were soft enough to be used as tires showed a very poor resistance to repeated flexing, while those polyurethanes which were sufficiently resistant to flexing proved to be unsatisfactory for use in tires because they were not rubbery enough, that is, they were more like leather than like rubber.

The use of certain organic peroxides, particularly the di-tertiary alkyl peroxides, as curing agents for millable (solid) polyurethanes leads to an appreciable increase in flexural fatigue resistance without dramatic decrease in rubbery properties. This increase in flex resistance is encountered with conventional peroxide cured materials such as those disclosed by Gruber et al. in Ind. Eng. Chem., 51, pp. 151–164 (February 1959). The marked disadvantage of this cured material for use in tires is the fact that the polyisocyanate and the active hydrogen-containing compound have always been reacted first before addition of the peroxide curing agent, and the peroxide, in turn, was added to the solid (i.e., "gum") reaction product with the result that the shaping operations after peroxide addition had to be performed with the material in the solid state and hence the advantage of polyurethanes as potential "liquid rubbers" could not be made use of. Before my invention, attempts to make use of peroxide cure in liquid polyurethane systems have been unsuccessful.

It is an object of my invention to provide a method for the production of polyurethane elastomers which are characterized by having an outstanding resistance to repeated flexing and by being highly elastomeric.

It is a further object to produce such elastomers by use of liquid techniques rather than proceeding via the relatively unsatisfactory gum polyurethane intermediate route.

The provision of stable liquid polyurethane intermediates constitutes an additional object of my invention.

Other objects of my invention will be evident from the description thereof which follows.

I have unexpectedly found that I can produce a rubber having outstanding resistance to repeated flexing without any other physical properties being impaired. The rubber achieved through the use of my invention is admirably suited for use in making tires and other objects where repeated flexing is involved. I have further found that I can obtain this increase in flex resistance and still take advantage of the "liquid rubber" characteristics so advantageous in polyurethanes. That is, I have found that, through the use of my invention, I can make rubber products by a liquid casting operation whereby I can pour liquid into a mold of the desired configuration and, after heating the mold for a short time, obtain an elastomeric product in the shape desired with no need for any further conditioning operations.

Heretofore, most liquid cast systems involving the use of polyurethane elastomers have required the use of various diamine type curing agents or the use of an excess amount of a polyisocyanate to effect a cure through an allophanate linkage.

In the diamine cured system, there is a disadvantage in that either long conditioning times (i.e., 10–14 days after the curing operation) or long curing times (10 hours or more) are required before the cast product can be used. A further disadvantage of diamine cured systems resides in the fact that good resistance to repeated flexing can only be obtained at the expense of the rubbery nature of the material. Thus, a diamine cured material having an excellent resistance to flexing will appear leathery and will have a Shore A Durometer hardness index of 60 or greater. Isocyanate cured materials will generally have relatively poor resistance to repeated flexing; and, because of the relatively large amounts of isocyanate required to cause a satisfactory cure, the hardness of these materials will also be quite high. The use of a catalyst to promote the isocyanate curing reaction will not change matters appreciably. In addition, very long curing times (10–12 hours or more) and the necessity for subsequent aging also render this system somewhat less than desirable.

Briefly, my invention comprises the mixing together in the liquid phase of a linear polyester diol or polyether diol with a di-tertiary alkyl peroxide, a urethane catalyst and an organic diisocyanate. This liquid mixture may then be cast into a mold of the desired configuration and heated for a short time, after which the product may be removed and will be found to be in substantially completed condition and ready for immediate use.

My invention makes use of my discovery that there is an unexpected combined effect between di-tertiary alkyl peroxides and urethane catalysts under certain conditions. Thus, when a linear polyester diol or a linear polyether diol, a diisocyanate, a di-tertiary alkyl peroxide and a urethane catalyst are all reacted together in the liquid phase in the correct proportions, there is a tremendous increase in resistance to flexing exhibited by the resultant product as contrasted to products obtained either:

(a) By reacting together, in the liquid phase, a linear polyester or polyether diol, a diisocyanate and a urethane catalyst and thereafter adding a di-tertiary alkyl peroxide to the solid reaction product; or (b) By reacting together, in the liquid phase, a linear polyester or polyether diol with a diisocyanate and a di-tertiary alkyl peroxide while omitting a urethane catalyst.

My preferred active hydrogen-containing substances are those hydroxyl-terminated linear polyesters and polyethers having molecular weights ranging between 1,000 and 4,000, which are liquid at 50° C., which have acid numbers below 2 and hydroxyl numbers ranging from 20 to 120 and usually from 40 to 80, and which may conveniently be designated as polyester diols and polyether diols. Mixtures of applicable polyesters with applicable polyethers are also suitable for use in my invention.

Preferred polyesters are usually prepared by reacting one or more glycols with one or more aliphatic saturated dicarboxylic acids, using a slight excess of glycol over acid so that the resultant linear polyester chains are terminated by alcoholic hydroxyl groups. An example of such a polyester is the product obtained by condensation polymerization of adipic acid with a mixture of ethylene glycol and propylene glycol.

Preferred polyethers may be represented by the formula $H(OR)_nOH$, where R is an alkylene group containing at least 2 linear carbon atoms and no tertiary hydrogen atom, and where $n$ is an integer such that the molecular weight of the polyether falls within the range specified. An example of a suitable polyether is polytetramethylene glycol.

Non-linear polyesters or polyethers are not suitable for use in my invention because such systems may be cured without the use of peroxides and the presence of peroxide curing agents will not have very much effect on the final product.

The isocyanate-containing substances must be diisocyanates since the use of higher polyisocyanates would lead to premature cross-linking. Applicable diisocyanates include the polymethylene diisocyanates such as hexamethylene diisocyanate, the alkylene diisocyanates such as propylene-1,2-diisocyanate, the cycloalkylene diisocyanates such as 1,4-diisocyanatocyclohexane, as well the aromatic diisocyanates such as m- and p-phenylene diisocyanate, 2,4- and 2,6-toluene diisocyanate, p,p'-diphenyl diisocyanate and 1,5-naphthalene diisocyanate. Also included in this latter (i.e., aromatic) category are the aliphatic-aromatic diisocyanates such as p,p'-diphenylmethane diisocyanate and phenylethylene diisocyanate.

The peroxides employed in this invention must be soluble in the polyester or polyether employed and should have the formula R—O—O—R', where R and R' (which may or may not be similar) are radicals selected from the group consisting of

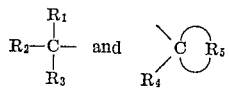

$R_1$ through $R_4$ being selected from the group consisting of alkyl radicals, aryl radicals and aralkyl radicals. The unit is a radical wherein the tertiary carbon atom

attached to the peroxide oxygen is contained within an alicyclic radical in which $R_5$ is an alkylene radical having from 3 to 6 carbon atoms as, for example, in diphenylcyclohexyl peroxide.

It is preferred to use di-α-cumyl peroxide which has the formula

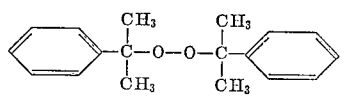

Other suitable peroxides include di-t-butyl peroxide, di-t-amyl peroxide, t-butyl-1-methyl-cyclohexyl peroxide, di-(3-methyl-pentynyl)-3-peroxide, 2,2-bis(t-butyl-peroxy)-propane, cymyl cumyl peroxide, methyl cumyl peroxide and 1-isobutoxy-1-cumyl peroxyethane. Peroxides other than the di-tertiary alkyl compounds may cure polyurethanes to a greater or lesser extent, but they do not yield the tremendous increase in resistance to flexing that is shown by the di-tertiary alkyl peroxides as used in my invention.

The urethane catalysts are those catalysts which are well known to the art as promoting the reaction of hydroxyl groups with isocyanate groups leading to formation of urethane groups. The particular catalyst employed must be soluble in the polyester or polyether employed.

A preferred series of urethane catalysts is the metal complexes of diones, the carbonyl groups thereof being separated by one methylene group (i.e., 1,3-diketones). These are characterized as follows:

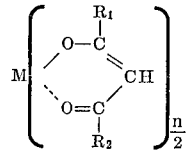

where $R_1$ and $R_2$ are alkyl or aryl radicals and $n$ is the coordination number of the metal, M. The metal may, in addition, be bonded to one or more separate oxygen atoms, such as in vanadyl acetylacetonate,

Metal acetylacetonates which catalyze this reaction include ferric, vanadium (+3), vanadyl, cupric, zinc, cobaltic, cobaltous, and manganic, but do not include aluminum, calcium and chromic. Ferric acetylacetonate is particularly preferred.

A further discussion of satisfactory urethane catalysts is found in British Patent 790,209. Such catalysts include teritary amines such as alkyl amines, hexahydro-dimethyl aniline, pre-methylated diethylene triamine and triethylene tetramine, dimethyl piperazine, pyridine, quinoline, and many other compounds.

The elastomeric product of my invention is generally made by mixing from 0.001 to about 0.1 part by weight of the urethane catalyst with about 100 parts by weight of the polyester or polyether at a temperature high enough to effect solubilization of the urethane catalyst. More catalyst than 0.1 part generally reduces the stability of the final liquid mixture to a very great extent. Usually, a temperature of 100° C. should not be exceeeded. This mixture, after being cooled to 50° C. or below, is then mixed with from about 1 to about 3 parts by weight of the di-tertiary alkyl peroxide curing agent. More than about 4 parts of peroxide curing agent does not yield a satisfactory cure. The material is cooled at 50° C. or below before peroxide addition to avoid any possible decomposition of the peroxide at the higher temperatures. From 0.95 to about 1.05 moles of diisocyanate are charged to the mixture per mole of polyester or polyether employed. Below about 0.95 mole of diisocyanate, there is, at best, a poor cure and, above about 1.05 moles, a post cure conditioning period is required. This mixture is then cast to the desired shape as by pouring into a mold, and the temperature is then raised in one or more stages to effect cure. The temperature is raised to about 150–175° C. or the peroxide decomposition temperature, which ever is greater, and maintained at that point for about 1 to 2 hours. The times and temperatures involved will vary with the particular components used. If a two-stage heating system is desired, the temperature of the mold is first raised to a level sufficient to insure complete reaction of the polyester or polyether with the diisocyanate. A temperature of about 100° C. is usually sufficient for this. After being maintained at this level for a period of time, usually from 30 to 60 minutes, the temperature is then raised to a higher level sufficient to insure decomposition of the peroxide and resultant curing of the polyurethane elastomer. A temperature range of 150 to 175° C. is generally satisfactory for this second stage.

I have found that the mixture of polyester or polyether, di-tertiary alkyl peroxide and urethane catalyst is stable at room temperature for long periods of time.

I have also found that optimum results of my invention are obtained when the diisocyanate is not added to this mixture until just prior to the time that the material is to be cast into the shaping mold. Although I am not certain of the reason for the undesirability of adding diisocyanate prior to the indicated time, it may be because, if some diisocyanate is initially present, it will react with the polyester or polyether on standing and then, upon heating, some additional diisocyanate may react again with the already reacted material to form allophanate cross-links. Accordingly, a preferred form of the process of my invention invloves mixing the polyester or polyether, the peroxide, and the urethane catalyst prior to incorporation of the diisocyanate. This mixture, being stable, can be made up in very large quantities for use as desired. Whenever warranted, part of this mixture may be transfered to another mixing apparatus and the diisocyanate added thereto at a temperature less than about 50° C. a short time prior to the casting of the liquid into the mold.

By virtue of this invention, it is now possible not only to achieve an elastomeric product having an increased resistance to repeated flexing but it is also possible for the first time in a liquid castable polyurethane system to employ an essentially 1 to 1 molar ratio of diisocyanate to polyester or polyether. This appreciably reduces the cost of the final product since it enables eliminating upwards of ⅔ of the very expensive diisocyanate that must conventionally be used in liquid systems. It is to be emphasized that there must not be appreciably more than one mole of diisocyanate per mole of polyester or polyether. More diisocyanate than this will not yield the desired results.

Conventional fillers may be added to the composition without departing from the spirit of the invention. Such fillers as titanium dioxide and carbon black may be added to the stable polyester-catalyst-peroxide mixture, and the enhancement of physical properties which is to be expected from the use of fillers may thereby be achieved.

Further advantage and features of the present invention may be ascertained from the following examples, in which the physical property called "flex life" is obtained through the use of the De Mattia Flex Test described in ASTM Standard D430–57T, Method B. Dumb-bell shaped samples are flexed until breakage and the number of cycles until breakage is recorded.

*Example 1*

362.0 parts by weight of a linear, hydroxyl terminated polyester of 1980 molecular weight and 0.02 acid number, made from adipic acid and a 70/30 mixture of ethylene and propylene glycols, were heated to 100° C. with 0.05 part by weight of ferric acetylacetonate. After the mixture had been agitated for 15 minutes, the temperature thereof was dropped to 50° C., and 8.15 parts by weight of 95% crystalline di-α-cumyl peroxide (a commercial product called "DiCup 98") were added. The system was stirred and evacuated until the peroxide dissolved. After this liquid mixture had been stored at room temperature for a long period of time, 46.4 parts by weight (1.01 moles per mole of polyester) of diphenylmethane diisocyanate (molten, clear liquid) were added at 50° C., the mixture being stirred under vacuum for four minutes. The material was then poured into a mold, which was placed in a press at a pressure 4000 p.s.i. and heated for 30 minutes at 220° F. followed by heating for 60 minutes at 305° F. The final cured product had the following properties:

| | |
|---|---|
| Scott tensile, p.s.i. | 2560 |
| Elongation at break, percent | 850 |
| Shore A Durometer, hardness | 35 |
| Set | 0.20 |
| Tear, lbs./0.1" | 1.8 |
| Modulus at 300% elongation, p.s.i. | 150 |
| Torsional hysteresis, R.T. | 0.154 |

*Example 2*

The following example was performed repeating the procedure of Example 1.

| Composition: | Parts by weight |
|---|---|
| Polyester as in Example 1 | 100 |
| "DiCup 98" | 1.69 |
| Ferric acetylacetonate | 0.01 |
| Diphenylmethane diisocyanate | [1] 12.8 |

| Properties of resultant product: | |
|---|---|
| Scott tensile, p.s.i. | 1900 |
| Elongation at break, percent | 940 |
| Shore A Durometer, hardness | 33 |
| Tear, lbs./0.1" | 2.1 |
| Modulus at 300% elongation, p.s.i. | 120 |
| Torsional hysteresis, R.T. | 0.184 |
| Flex-life, kilocycles | [2] 1000+ |

[1] 1.03 moles per mole of polyester.
[2] Sample had not failed after 1000 kilocycles.

Similar and equally satisfactory results were obtained when other polyesters were substituted for the polyester employed in Example 2. Thus, the following liquid polyesters, having molecular weights ranging from 1000 to 4000 and acid numbers below 2, were successfully employed:

A. The reaction product of ethylene glycol and adipic acid.
B. The reaction product of propylene glycol and adipic acid.
C. The reaction product of tetramethylene glycol and adipic acid.
D. The reaction product of ethylene glycol and sebacic acid.
E. The reaction product of propylene glycol and sebacic acid.
F. The reaction product of tetramethylene glycol and sebacic acid.
G. The reaction product of 50:40 ethylene:tetramethylene glycols and adipic acid.
H. The reaction product of 70:30 ethylene:propylene glycols and sebacic acid.
I. The reaction product of ethylene or propylene glycols and dimer acid (the 36 carbon atom dicarboxylic acid prepared by the dimerization of linoleic acid).
J. The reaction product of tetramethylene glycol and isosebacic acid.

In addition, equally successful results were obtained when various polyether diols were substituted for the polyester of Example 2. Such suitable polyether diols included:

A. Polytetramethylene glycol.
B. Polytrimethylene glycol.
C. Polyethylene glycol.
D. Copolymers of ethylene glycol and tetramethylene glycol.

The above polyesters and polyethers gave satisfactory results when used with the diisocyanate of Example 2 or with from 0.95 to 1.05 moles of the following diisocyanates, among others, per mole of polyester or polyether:

A. m- and p-phenylene diisocyanates.
B. Toluene diisocyanate.
C. Phenylethylene diisocyanate.
D. 1,4-diisocyanatocyclohexane.

Likewise, other peroxide curing agents and urethane catalysts as disclosed above were found to yield satisfactory results with the above polyesters, polyethers and diisocyanates.

Example 3

Where the procedure of Example 2 was followed except that the ferric acetylacetonate was omitted, there was a tremendous decrease in flex-life observed.

Composition: Parts by weight
  Polyester as in Example 1 _____ 100
  Diphenylmethane diisocyanate _____ 12.7
  "DiCup 98" _____ 1.8

Physical properties of resultant product:
  Scott tensile, p.s.i. _____ 3965
  Elongation at break, percent _____ 660
  Shore A Durometer, hardness _____ 47
  Tear, lbs./0.1" _____ 2.0
  Modulus at 300% elongation, p.s.i. _____ 300
  Torsional hysteresis, R.T. _____ 0.067
  Flex-life, kilocycles _____ 7.5

It is quite apparent that a composition of this type would be far less satisfactory in applications where a great deal of flexing is required.

Example 4

To show the difference between the products made by the process of this invention and the products that are obtained if prior art practices relative to peroxide curing of polyurethanes are followed, the following experiment was carried out.

100 parts by weight of the polyester described in Example 1 were reacted with 12.7 parts by weight of diphenylmethane diisocyanate and 0.02 part by weight of ferric acetylacetonate at 100° C. for 30 minutes. The resulting gum-like material was then milled on a conventional rubber mill and 1.8 parts by weight of "DiCup 98" were added on the mill. The material was then compression molded and cured for 60 minutes at 150° C.

The following physical properties were obtained:

Scott tensile, p.s.i. _____ 4975
Elongation at break, percent _____ 730
Shore A Durometer, hardness _____ 48
Tear, lbs./0.1" _____ 3.5
Modulus at 300% elongation, p.s.i. _____ 300
Torsional hysteresis, R.T. _____ 0.074
Flex-life, kilocycles _____ 24.3

While the ratio of the starting materials in this Example 4 is almost identical with that of Example 2, the flex life obtained in Example 2 (an illustration of this invention) is more than 40 times greater than that obtained in Example 4.

Example 5

The purpose of this example is to demonstrate what happens when a conventional liquid polyurethane intermediate is treated with a peroxide.

A mixture of 1 mole of a reaction product of a polyester of the type described in Example 1 and 2 moles of diphenylmethane diisocyanate was evacuated at 100° C. for 20 minutes. The reactor temperature was permitted to drop to 50° C.; 2 parts by weight of DiCup 98 were added, and stirring and evacuation were continued for 5 minutes. The liquid material was then poured into a mold and heated under pressure at 150° C. for 90 minutes. After cooling, the mold was opened and revealed a soft, gummy, stringy material with a viscosity only slightly higher than that of the original material.

Example 6

This example illustrates a typical diamine-cured polyurethane elastomer.

One mole of a polyester, made from adipic acid and a 60:40 mixture of ethylene and butylene glycols and having a molecular weight of 1921 and an acid number of less than 1, was reacted with 1.78 moles of 2,4-toluene diisocyanate for 1 hour at 100° C. to form a liquid prepolymer having an average molecular weight of about 2850. Two 100 gram samples of this viscous liquid were cured by mixing in 8.42 grams and 7.00 grams, respectively, of 4,4'-diamino-3,3'-dichloro diphenyl methane and holding at 110° C. for 2 minutes, casting into molds and curing for 1 hour at 150° C. The solid samples were then removed and conditioned for 2 weeks at 73° F. and 50% relative humidity. The properties of these materials after conditioning were as follows:

[Parts 4,4'-diamino-3,3'-dichlorodiphenyl methane]

|  | 7.00 | 8.42 |
|---|---|---|
| Scott tensile, p.s.i. | 4,270 | 5,720 |
| Elongation at break, percent | 630 | 750 |
| Shore A Durometer, hardness | 65 | 68 |
| Modulus at 300% elongation, p.s.i. | 540 | 500 |
| Flex life, kilocycles | 2.9 | 136.6 |

It is apparent from this example that high diamine ratios (8.42 parts per 100 parts of prepolymer is just about the limit in this regard) are necessary for higher flex life, but hardness also increases with increasing diamine levels.

Thus, the working examples indicate that the product obtained through the use of my invention has an outstanding resistance to repeated flexing. It also has a good tensile strength and is sufficiently soft to be a satisfactory rubber for use in tires.

The working examples also show that the prior art combinations do not give results comparable to those of my invention. Thus, the results obtained in the working examples may be tabulated as follows:

| Example | System | Flex Life (kilocycles) | Shore A Hardness |
|---|---|---|---|
| 2 | Liquid system of my invention using peroxide, catalyst, polyester and polyisocyanate. | 1,000 - | 33 |
| 3 | Liquid system as above except that catalyst was omitted. | 7.5 | 47 |
| 4 | Polyester, catalyst and diisocyanate reacted to form a gum and then peroxide added on a mill. | 24.3 | 48 |
| 5 | Liquid system using peroxide, polyester and twice as much diisocyanate. | No cure | |
| 6 | Liquid system using polyester, diisocyanate and diamine. | 137 | 68 |

It is easily apparent from these data that, when I use a liquid system according to the teachings of my invention, I achieve an increase in flex life of over 130 times the flex life obtained when no urethane catalyst is employed. I also achieve a flex life of over 40 times the flex life obtained when the identical components are mixed in a different manner, i.e., by first forming a gum and then adding the peroxide. In both Examples 3 and 4, not only do the samples show a poorer flex life but they also show a substantial increase in hardness.

In Example 6, where a diamine cure was employed, fairly good flex life was exhibited by the sample but this flex life was achieved at the expense of the rubbery properties of the material. The Shore A hardness of this material, 68, is over twice as great as that of the material of my invention, and this diamine-cured material looks, at room temperature, more like a leather than a rubber.

The hardness of the products of my invention may be varied to some extent by varying the curing times and temperature. Thus, using the two stage curing system described above, a softer material is obtained than when a single stage curing cycle is employed. For end use in tires, the single stage curing cycle is sufficient. A pneumatic tire generally requires a Shore A Durometer hardness index of less than about 55. A solid polyurethane tire requires a hardness index on the order of about 45–50. Good rubbers even softer than these requirements may be obtained by using the two stage curing system. Such softer rubbers may be used to make printing rollers and other molded products requiring softness, high abrasion resistance and high resistance to repeated flexing.

Having thus described my invention, that which I desire to claim and protect by Letters Patent is as follows:

1. A process for manufacturing shaped elastomeric articles having increased stability to withstand repeated flexing, comprising admixing in the liquid phase below a temperature at which reaction will occur and above a temperature at which solids will remain present,
   (1) a linear hydroxyl-terminated compound having an acid number below 2 and a molecular weight ranging from about 1000 to about 4000 and selected from the group consisting of (a) a polyester prepared by the esterification of an aliphatic dicarboxylic acid with an excess of an alkylene glycol, (b) a polyether represented by the formula $H(OR)_nOH$ wherein R is an alkylene group containing at least two linear carbon atoms and $n$ is an integer such that the molecular weight of said polyether falls within the range specified, and (c) mixtures of said polyester (a) and said polyether (b),
   (2) from about 0.001 to about 0.1 part by weight, based on 100 parts by weight of said hydroxyl-terminated compound, of a catalyst for the promotion of the reaction between hydroxyl groups and isocyanate groups,
   (3) from about 1 to about 3 parts by weight, based on 100 parts by weight of said hydroxyl-terminated compounds of dicumyl peroxide, and
   (4) from about 0.95 to about 1.05 moles of an organic diisocyanate per mole of said hydroxyl-terminated compound,
      said organic diisocyanate being admixed immediately prior to casting the resultant liquid mixture and thereafter casting the resultant liquid mixture into a shaping means and applying heat thereto to cause the formation of a shaped, cured polyurethane elastomer.

2. A process of manufacturing shaped elastomeric articles having increased stability to withstand repeated flexing, comprising admixing in the liquid phase below a temperature at which reaction will occur and above a temperature at which solids will remain present,
   (1) a linear hydroxyl-terminated compound having an acid number below 2 and a molecular weight ranging from about 1000 to about 4000 and selected from the group consisting of (a) a polyester prepared by the esterification of an aliphatic dicarboxylic acid with an excess of an alkylene glycol, (b) a polyether represented by the formula $H(OR)_nOH$ wherein R is an alkylene group containing at least two linear carbon atoms and $n$ is an integer such that the molecular weight of said polyether falls within the range specified, and (c) mixtures of said polyester (a) and said polyether (b),
   (2) from about 0.001 to about 0.1 part by weight, based on 100 parts by weight of said hydroxyl-terminated compound, of a soluble metal complex of a dione compound, the carbonyl groups thereof being separated by one methylene group,
   (3) from about 1 to 3 parts by weight based on 100 parts by weight of said hydroxyl-terminated compounds of dicumyl peroxide, and
   (4) from about 0.95 to about 1.05 moles of an organic diisocyanate per mole of said hydroxyl-terminated compound,
      said organic diisocyanate being admixed immediately prior to casting resultant liquid mixture and thereafter casting the resultant liquid mixture into a shaping means and applying heat thereto to cause the formation of a shaped, cured polyurethane elastomer.

3. A process for manufacturing shaped elastomeric articles having increased stability to withstand repeated flexing comprising admixing in the liquid phase below a temperature at which reaction will occur and above a temperature at which solids will remain present,
   (1) a linear hydroxyl-terminated compound having an acid number below 2 and a molecular weight ranging from about 1000 to about 4000 and selected from the group consisting of (a) a polyester prepared by the esterification of an aliphatic dicarboxylic caid with an excess of an alkylene glycol, (b) a polyether represented by the formula $H(OR)_nOH$ wherein R is an alkylene group containing at least two linear carbon atoms and $n$ is an integer such that the molecular weight of said polyether falls within the range specified, and (c) mixtures of said polyester (a) and said polyether (b),
   (2) from about 0.001 to about 0.1 part by weight, based on 100 parts by weight of said hydroxyl-terminated compound, of a soluble metal complex of a dione compound, the carbonyl groups thereof being separated by one methylene group,
   (3) from about 1 to about 3 parts by weight, based on 100 parts by weight of said hydroxyl-terminated compound, of an organic peroxide represented by the formula R—O—O—R', wherein R and R' are tertiary radicals selected from the group consisting of

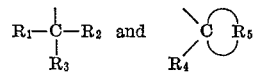

wherein $R_1$, $R_2$ $R_3$ and $R_4$ are selected from the group consisting of alkyl, aryl and aralkyl radicals, and wherein the group

represents an alicyclic radical in which $R_5$ is an alkylene radical having from 3 to 6 carbon atoms, and
   (4) from about 0.95 to about 1.05 moles of an organic diisocyanate per mole of said hydroxyl-terminated compound,
      said organic diisocyanate being mixed immediately prior to casting the resultant liquid mixture and thereafter casting the resultant liquid mixture into a shaping means and applying heat thereto to cause the formation of a shaped, cured polyurethane elastomer.

4. A process for manufacturing shaped elastomeric articles having increased ability to withstand repeated flexing comprising admixing in the liquid phase at a temperature below 100° C.
   (1) A linear hydroxyl-terminated compound having an acid number below 2 and a molecular weight ranging from about 1000 to about 4000 and selected from the group consisting of (a) a polyester prepared by the esterification of an aliphatic dicarboxylic acid with an excess of an alkylene glycol, (b) a polyether represented by the formula $H(OR)_nOH$ wherein R is an alkylene group containing at least 2 linear carbon atoms and $n$ is an integer such that the molecular weight of said polyether falls within the range specified, and (c) mixtures of said polyester (a) and said polyether (b) and
   (2) from about 0.001 to about 0.1 part by weight, based on 100 parts by weight of said hydroxyl-terminated compound, of a soluble metal complex of a dione compound, the carbonyl groups thereof being separated by one methylene group, and thereafter adding at a temperature below 50° C.
   (3) from about 1 to about 3 parts by weight, based on 100 parts by weight of said hydroxyl-terminated compound, of an organic peroxide represented by the formula R—O—O—R', wherein R and R' are tertiary radicals selected from the group consisting of

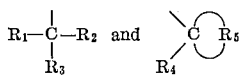

wherein $R_1$, $R_2$, $R_3$ and $R_4$ are selected from the group consisting of alkyl, aryl and aralkyl radicals, and wherein the group

represents an alicyclic radical in which $R_5$ is an alkylene radical having from 3 to 6 carbon atoms, and (4) from about 0.95 to about 1.05 moles of an organic diisocyanate per mole of said linear hydroxyl-terminated compound, said organic diisocyanate being admixed immediately prior to casting the resultant liquid mixture and thereafter casting the resultant liquid mixture into a shaping means and applying heat thereto to cause the formation of a shaped, cured polyurethane elastomer.

5. The process of claim 4 wherein said soluble metal complex of a dicarbonyl compound is further characterized as being a metal acetylacetonate.

6. The process of claim 4 wherein said organic diisocyanate is selected from the class consisting of m-phenylene diisocyanate, p-phenylene diisocyanate, p,p'-di-phenyl diisocyanate, p,p'-diphenylmethane diisocyanate, 1,5-naphthalene diisocyanate, 2,4-toluene diisocyanate and 2,6-toluene diisocyanate.

7. The process of claim 4 wherein said polyester is the product prepared by the esterification of adipic acid with a mixture of ethylene and propylene glycols.

8. The process of claim 4 wherein said polyether is polytetramethylene glycol.

9. A process for manufacturing shaped elastomeric articles having increased ability to withstand repeated flexing comprising admixing in the liquid phase at a temperature below 100° C.

(1) a linear hydroxyl-terminated compound having an acid number below 2 and a molecular weight ranging from about 1000 to about 4000 and selected from the group consisting of (a) a polyester prepared by the esterification of an aliphatic dicarboxylic acid with an excess of an alkylene glycol, (b) a polyether represented by the formula $H(OR)_nOH$ wherein R is an alkylene group containing at least 2 linear carbon atoms and $n$ is an integer such that the molecular weight of said polyether falls within the range specified, and (c) mixtures of said polyester (a) and said polyether, and (2) from about 0.001 to about 0.1 part by weight, based on 100 parts by weight of said hydroxyl-terminated compound, of ferric acetylacetonate, and (3) from about 1 to about 3 parts by weight, based on 100 parts by weight of said hydroxyl-terminated compound, of an organic peroxide represented by the formula R—O—O—R', wherein R and R' are tertiary radicals selected from the group consisting of

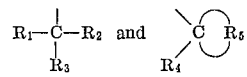

wherein $R_1$, $R_2$, $R_3$ and $R_4$ are selected from the group consisting of alkyl, aryl and aralkyl radicals, and wherein the group

represents an alicyclic radical in which $R_5$ is an alkylene radical having from 3 to 6 carbon atoms, and (4) from about 0.95 to about 1.05 moles of an organic diisocyanate per mole of said linear hydroxyl-terminated compound, said organic diisocyanate being admixed immediately prior to casting the resultant liquid mixture and thereafter casting the resultant liquid mixture into a shaping means and applying heat thereto to cause the formation of a shaped, cured polyurethane elastomer.

10. The process of claim 9 wherein said organic peroxide is dicumyl peroxide.

References Cited by the Examiner

UNITED STATES PATENTS

| 2,897,181 | 7/59 | Windemuth | 260—75 |
| 3,031,422 | 4/62 | Posnansky | 260—75 |

FOREIGN PATENTS

| 820,004 | 9/59 | Great Britain. |
| 828,718 | 9/55 | Great Britain. |

LEON J. BERCOVITZ, Primary Examiner.

MILTON STERMAN, NORMAN TORCHIN, DONALD E. CZAJA, Examiners.